Oct. 19, 1965  C. T. LEVETT  3,212,136
DIE FOR EXTRUDING HOLLOW ARTICLES
Filed Dec. 17, 1962  2 Sheets-Sheet 1

INVENTOR.
C.T. LEVETT
BY *Young and Quigg*
ATTORNEYS

Oct. 19, 1965

C. T. LEVETT 3,212,136

DIE FOR EXTRUDING HOLLOW ARTICLES

Filed Dec. 17, 1962

INVENTOR.
C.T. LEVETT
BY Young & Quigg
ATTORNEYS 3,212,136
DIE FOR EXTRUDING HOLLOW ARTICLES
Charles T. Levett, Bartlesville, Okla., assignor to Phillips Petroleum Company, a corporation of Delaware
Filed Dec. 17, 1962, Ser. No. 245,008
5 Claims. (Cl. 18—14)

This invention relates to a die for extruding hollow thermoplastic material. In one aspect this invention relates to an improved die assembly for forming a parison of thermoplastic material.

In the blow molding process it is common practice to form a parison by downward extrusion of molten thermoplastic material from an annular die formed by supporting a mandrel concentrically in a circular die opening. Gas under pressure is admitted into the parison to form the desired article by blowing the thermoplastic material against the confining walls of a mold. It has been the common practice to construct annular dies for this purpose by supporting the mandrel in the die with a web or spider of metal rods or braces around which the molten thermoplastic flows to the annular die opening. It has been found that when so operating, the blow molded articles made from the parison show streaks or webbed structure as evidenced by longitudinal lines in the walls of the finished article. These lines or streaks are not only objectionable from the view point of appearance but are frequently points of weakness where failure can occur as the result of an impact. Such streaking is believed to arise from the property of a thermoplastic material commonly referred to as "elastic memory" of the thermoplastic when in the molten state and results from passage of the molten thermoplastic around the web which supports the mandrel.

It is an object of this invention to provide a die assembly for blow molding equipment which eliminates the formation of streaks in a thermoplastic parison produced. The provision of a means for eliminating the mandrel supporting spider from a die assembly is still another object of this invention. A still further object of this invention is to provide a means for supporting a die mandrel concentrically in a die opening without the necessity of a spider structure in the die assembly. It is still another object of this invention to provide a die assembly for extruding a parison of thermoplastic material wherein the elastic nature of the molten thermoplastic material is spent before the parison is extruded. Other objects and advantages of the invention will be apparent to one skilled in the art upon study of the present disclosure including the drawing wherein:

Broadly, the invention comprises a die assembly wherein the die mandrel is supported in the die orifice by being disposed concentrically through a ram which operates to force molten thermoplastic material from the resulting annular die opening to form a parison for blow molding equipment. By construction of the die according to the concept of the invention the mandrel is held firmly in place without the presence of supporting webs or braces around which the plastic would flow, thus eliminating the source of the problem of streaking in blow molded items. It is a feature of the invention that the receiving chamber in the die assembly be of sufficient volume to allow a "dwell" in the chamber so as to provide a residence time sufficient to spend the elastic memory property of the molten thermoplastic as a result of the change of direction of introduction into the receiving chamber. It is also a feature of the invention that the quantity of thermoplastic extruded, i.e., the length of the parison, is controlled by stops which determine the distance of travel of the ram.

Figures 1, 2:
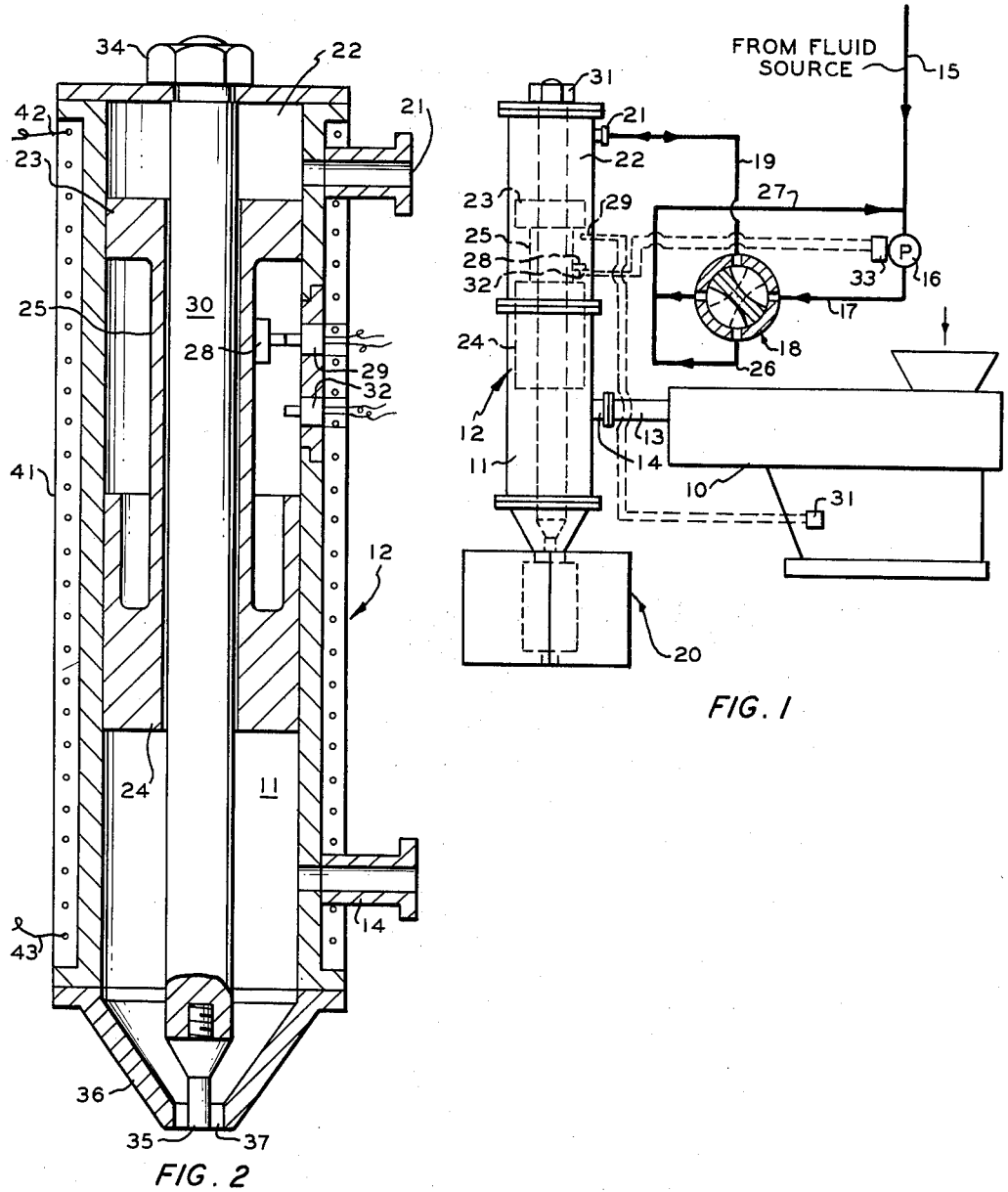
FIGURE 1 is a diagrammatic illustration of a blow molding operation according to the present invention.
FIGURE 2 is an elevational view, partly in section, of the die assembly of FIGURE 1.

Referring now to FIGURE 1 of the drawing, molten polymer is passed from extruder 10 into chamber 11 of annular die assembly 12 via conduit 13 and port 14, raising ram 24 to provide space for the polymer. The extruder is then stopped by limit switch 29 which is actuated by trigger 28. Limit switch 29 can be a micro switch which actuates a solenoid switch 31 to stop the extruder 10. Fluid from a source (not shown) is passed via conduit 15, pump 16, conduit 17, valve 18 and conduit 19 to port 21 of die assembly 12 and into chamber 22, forcing piston 23 downward. Ram 24 is connected to piston 23 by means of sleeve 25 so that ram 24 is driven downwardly simultaneously with piston 23. The downward movement of ram 24 forces molten polymer into mold 20. When ram 24 reaches its lowermost position, trigger 28 actuates limit switch 32 which, in turn, actuates a solenoid switch 33 to stop the motor which operates pump 16. Valve 18 is turned to the position shown in dotted lines so that fluid from pump 16 is passed via conduit 17, valve 18, and conduit 26 to conduit 27 and to the fluid source. Fluid is removed from chamber 22 via port 21, conduit 19, valve 18 and conduit 27 and is passed to the fluid source. Valve 18 can be operated by the limit switches 29 and 32, or can be operated manually.

The die assembly of FIGURE 1 is shown in greater detail in FIGURE 2. The mandrel 30 is secured to the die assembly housing by means of nut 34 and is maintained centered in the die assembly housing by means of the piston 23, ram 24 and sleeve 25 through which the mandrel 30 is concentrically disposed. The piston 23, ram 24 and sleeve assembly 25 are fabricated to fit slidably around mandrel 30 and within the die assembly housing which acts as a cylinder. The mandrel 30 terminates in a pin 35 centrally positioned in the opening of the die cap 36 to form annulus 37 through which the molten polymer is forced or extruded. Pin 35 is removable so that different sizes of pins can be employed. Die cap 36 is also removable to accommodate caps with different sizes of openings.

The die assembly 12 can be heated by an electrical heater 41 having leads 42 and 43 connected to a suitable source of electrical energy (not shown) so as to keep the polymer in the proper molten state.

Figure 3:
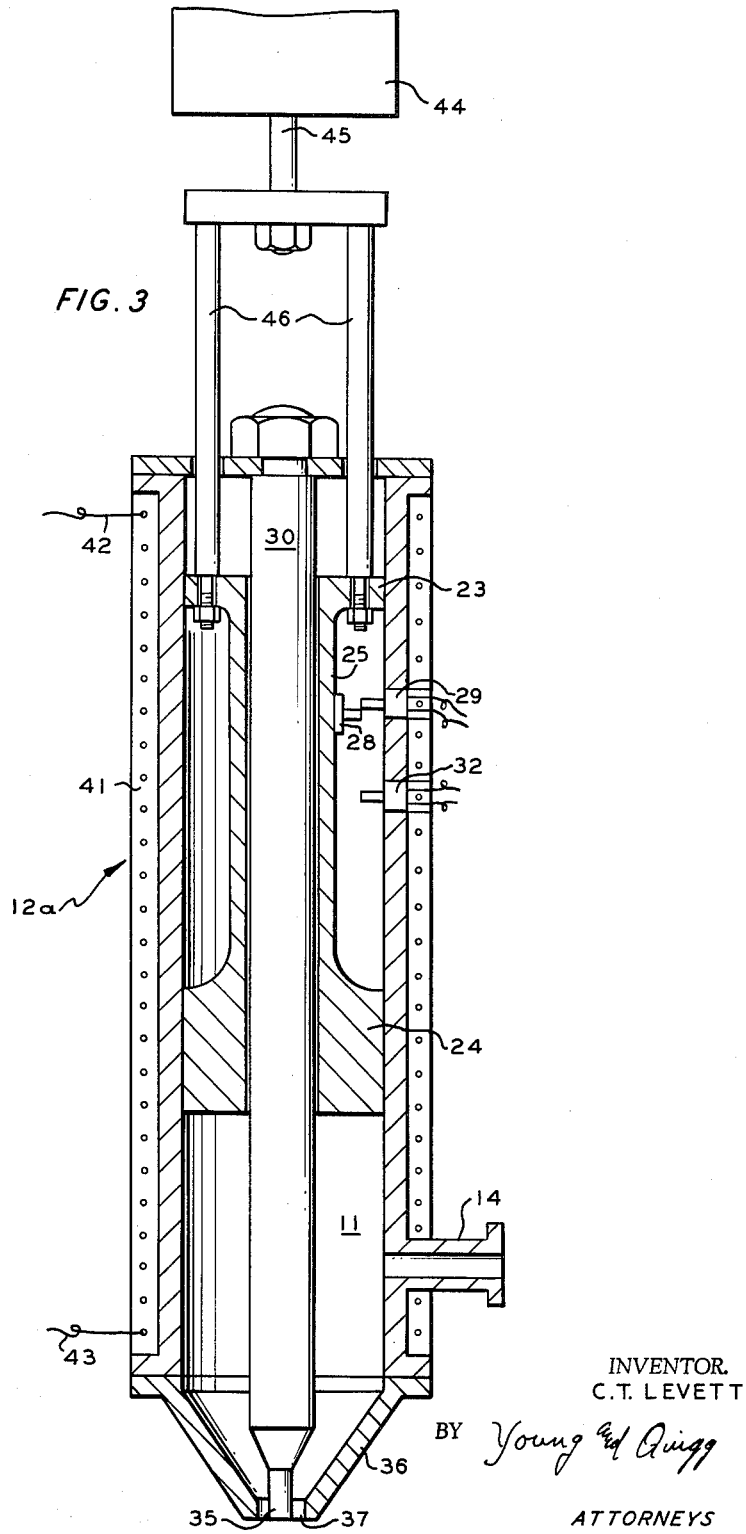
FIGURE 3 is an elevational view, partly in section, of a modification of the die assembly of FIGURE 2.

A modification of the die assembly 12 of FIGURES 1 and 2 is shown as assembly 12a in FIGURE 3 wherein the ram 24, sleeve 25 and piston 23 are operated by an external fluid piston and cylinder 44. The piston rod 45 is connected to the piston 23 by drive rods 46. The limit switches 29 and 32 can be actuated by a trigger 28 attached to sleeve 25 as shown, or the limit switches can be mounted adjacent the piston rod 45 and actuated by a trigger mounted on the piston rod.

In the operation of either modification the ram and piston assembly is raised by the polymer extruded into the die assembly so as to avoid the formation of bubbles or voids in the polymer charge. The die opening can be valved if desired but it has been found that a valve is not necessary because the force required to pass polymer through the die opening is much greater than the force required to raise the ram and piston. A valve in conduit 13 from the extruder 10 to the inlet 14 has also been found unnecessary because the polymer does not flow into the extruder when the ram is lowered.

The die assembly of this invention is applicable for use with any conventional blow molding equipment and is useful in extruding any of the thermoplastic materials employed for making hollow articles. The die assembly is particularly useful for preventing striae in articles molded from thermoplastic materials having the property of elastic memory.

Blow molding apparatus having incorporated therewith the die assembly of this invention produces hollow articles free from striae whereas apparatus having the die mandrel positioned by a spider produces articles having visible striae or longitudinal streaks when a material having elastic memory is utilized.

Solid, resinous polymers of 1-olefins comprise a class of polymers having the property of elastic memory. Such polymers of 1-olefins include homopolymers, copolymers and blends of homopolymers and copolymers. Polyethylene; polypropylene; copolymers of ethylene and propylene; and copolymers of ethylene and 1-butene made according to the practice of U.S. 2,825,721, issued March 4, 1958, to J. P. Hogan and R. L. Banks, and such polymers and copolymers made in the presence of organometal catalysts are particularly applicable for use with the method and means of the invention.

Other thermoplastic materials having the property of elastic memory include polymers and copolymers of methyl methacrylate; ethyl methacrylate; vinyl chloride; and vinyl acetate.

The die assembly of the invention is particularly beneficial in blow molding large hollow articles such as carboys, drums, and the like. Although streaking does sometimes occur in smaller articles such as vials, ampoules and bottles, the striations are neither so noticeable nor so harmful as in the larger articles.

Reasonable variations and modifications are possible within the scope of this disclosure without departing from the spirit and scope of the invention.

That which is claimed is:

1. A die assembly for extruding hollow thermoplastic articles comprising a substantially cylindrical housing having a die opening in one end and a cylindrical mandrel secured to the opposite closed end and terminating in said die opening to form an annular die opening; a movable piston positioned completely in said housing with its leading and trailing ends in contact with said housing, its center portion out of contact with said housing and having a central opening through which said mandrel passes; means connected to said housing for introducing fluid behind said piston to reciprocate said piston along said mandrel; and means to introduce plasticized thermoplastic material into said housing between said piston and said die opening.

2. A die assembly for extruding hollow thermoplastic articles comprising a housing; a piston positioned slidably in one end portion of said housing and completely enclosed by said housing; an orifice in the housing wall in the other end portion of said housing; a ram operatively connected to said piston by a sleeve and positioned in said housing so as to form a chamber at the orifice end portion of said housing; and a mandrel secured to said housing at the piston end portion thereof and slidably disposed concentrically through said piston, said sleeve, and said ram so as to terminate in said orifice thereby forming an annular orifice.

3. In extruding apparatus for producing hollow articles of thermoplastic material comprising means to produce a stream of plasticized thermoplastic material, a chamber of sufficient volume to spend the elastic memory of plasticized material for receiving plasticized material and having a die opening in one wall thereof, and a ram slidably positioned in said chamber for driving plasticized material out of said chamber through said die opening, the combination therewith of a piston completely enclosed within said chamber and operatively connected to said ram by a sleeve, a mandrel secured to a wall of said chamber opposite the die opening, passing through a close-fitting opening through said piston, said sleeve and said ram, and terminating in the center of said die opening whereby the ram maintains the mandrel centered in the die opening.

4. In a die assembly for extruding hollow thermoplastic articles including a housing having a closed end and an open end; a mandrel secured to the closed end of said housing and disposed within said housing to terminate in the open end thereof to form an annular opening with said open end; a ram slidably mounted on said mandrel adjacent the open end of said housing; a piston slidably mounted on said mandrel adjacent the closed end of said housing; a sleeve slidably mounted on said mandrel connecting said ram and said piston; and first means operatively connected to said die assembly for reciprocating said ram, said piston, and said sleeve in said housing; apparatus comprising switch means carried interiorly of said housing and operatively connected to said first means to control said first means and regulate the travel of said ram, said piston, and said sleeve in said housing; and trigger means carried by said sleeve within said housing for actuating said switch means responsive to the position of said sleeve in said housing.

5. Apparatus according to claim 4 wherein said switch means includes a first micro switch positioned to contact said trigger means to stop the travel of said ram, said piston, and said sleeve as they move toward the closed end of said housing; and a second micro switch positioned to contact said trigger means to stop the travel of said ram, said piston, and said sleeve as they move toward the open end of said housing.

References Cited by the Examiner

UNITED STATES PATENTS

| | | | |
|---|---|---|---|
| 2,289,787 | 7/42 | Kaschke et al. | 18—12 XR |
| 2,971,456 | 2/61 | Thomas | 18—12 XR |
| 2,982,993 | 5/61 | Jacobi | 18—5 |
| 3,002,615 | 10/61 | Lemelson | 18—12 XR |
| 3,069,722 | 12/62 | Kato | 18—5 |
| 3,080,614 | 3/63 | Adams | 18—55 |
| 3,081,489 | 3/63 | Jackson et al. | 18—5 |
| 3,082,484 | 3/63 | Sherman | 18—55 |

WILLIAM J. STEPHENSON, *Primary Examiner.*

MORRIS LIEBMAN, MICHAEL V. BRINDISI, *Examiners.*